United States Patent [19]

Jedo et al.

[11] 4,327,827
[45] May 4, 1982

[54] VIBRATORY FEEDER

[75] Inventors: Antoni Jędo, Gliwice; Waclaw Jachna, Tychy, both of Poland

[73] Assignee: Centralny Osrodek Projektowokonstrukcyjny Maszyn Gorniczych "Komag", Gliwice, Poland

[21] Appl. No.: 31,481

[22] Filed: Apr. 19, 1979

Related U.S. Application Data

[63] Continuation of Ser. No. 839,506, Oct. 4, 1977, abandoned.

[30] Foreign Application Priority Data

Nov. 14, 1976 [PL] Poland ............................. 193051

[51] Int. Cl.³ ............................................. B65G 27/04
[52] U.S. Cl. ................................................... 198/771
[58] Field of Search ............... 198/771, 752, 754, 755, 198/766, 763; 193/2 R, 32, 16; 209/275–277

[56] References Cited

U.S. PATENT DOCUMENTS

| 1,383,281 | 7/1921 | Bailey | 193/32 X |
| 2,713,415 | 7/1955 | Wurzbach | 198/763 |
| 2,873,555 | 2/1959 | Conrad | 193/16 X |
| 3,338,385 | 8/1967 | Sage | 198/771 |
| 3,469,672 | 9/1969 | Stutske et al. | 198/771 X |
| 3,648,828 | 3/1972 | McCaffrey et al. | 198/771 X |

Primary Examiner—Robert B. Reeves
Assistant Examiner—Douglas D. Watts
Attorney, Agent, or Firm—Michael N. Meller; Anthony H. Handal

[57] ABSTRACT

A vibratory feeder with a transport chute mounted on a supporting frame and a drive connected with said frame. The bottom of the transport chute is concave at said inlet means and convex at said outlet means has a shape similar to that of a horizontal stylized letter "S". A concave portion of the bottom of the transport chute is located near a feed delivery end, and a convex portion near a discharge end. The bottom of the chutes, its convex portion, is provided with a profile lining with a low coeficient of friction. The feeder has a built in screen in the convex portion of the bottom.

1 Claim, 9 Drawing Figures

VIBRATORY FEEDER

This is a continuation of application Ser. No. 839,506, filed Oct. 4, 1977, now abandoned.

BACKGROUND OF THE INVENTION

The present invention relates to a vibratory feeder adapted to receive and displace loose material, especially from narrow surfaces on to wide ones and conversely. A vibratory feeder provided with a transport chute in the form of a trapezoid having its working surface, i.e. the bottom of the chute, of a flat and smooth element is already known. This feeder is mainly used for the transport of fine-grained loose material.

Also known is a feeding arrangement with a trapezoidal chute delivering coarse-grained material from wide installations onto narrow ones e.g. slime from a screen on to a narrow conveyor, having the surface over which materials move and provided with a number of steps to prevent sticking of the material.

In order to maintain the required durability and increase the free vibration frequency of the chute, numerous plate or box-type ribs are provided under the bottom of the chute which together with the chute, form a flat lattice-type frame. Such a structure is also used in vibratory feeders that are provided with chutes of small dimensions. Due to the current developments in the field of mineral treatment installations, as revealed by a increase in capacity through the extension of their width, as for example, in heavy media separation plants, water jigs, screens, etc. where uniform feeding of these installations with raw material at 500–1500 tons per hour and more takes place. As a result a range of widths from 3 to 6 m has become necessary.

Acceptance of such materials from this type of installation and further transport on to narrow conveyors, into crushers, on to trucks and so on, give rise to the problems that also require solution. The need for creating conditions for a particularly smooth transport of material in order to avoid crushing of grains of coarse grained coal, for instance, during transport need also be considered.

It is a matter-of-course that under some conditions it may be advantageous to produce a feeder according to the invention with the bottom being it its plan view, trapezoidal in shape with rectangular segments attached to the narrower and wider base of the trapezoid. An abrasion-resisting profile lining is provided preferably with a corrugated surface and is placed on the bottom of the trapezoidal transport chute. The length and height of the wave depends on the grain size of the transported material. The lining is set at both sides of the plane of symmetry of the transport chute, so that the vertex of angle $\beta$ formed by the crests of the lining waves faces the narrower end of the trapezoidal chute. In order to prevent sticking of grains during transport of coarse grained material, deflecting plates that displace the grains towards the centre of the chute are fixed to the sides of the tapering trapezoidal chute. Those plates are asymmetrically distributed along the sides of the chute and form a free, zig-zag, tapering strip for grain flow.

The transport chute is mounted to an eight-bracket supporting frame placed under the bottom thereof, so that oscillating motion is transmitted from the drive to the chute. The frame consists of two oblong and two transverse roof-beams, the distance between the oblong roof-beams at the wider end of the chute being at least equal to half of the width of this end.

The feeder in an embodiment having a rectangular or widening transport chute, is provided with a built in grate at the convex portion of the chute near the discharge end. Also, the feeder rests on a structure of a building by means of elastic elements fastened to oblong and transverse roof beams of the frame of the building.

The most advantageous loading conditions for the feeder structure is created when the holders of the elastic elements are placed near the joint between the longitudinal and transverse beam.

The trapezoidal chute in the vibratory feeder, the longitudinal section of which is in the form of a horizontal letter "S", is employed to result in a number of technological and operational advantages, especially in installations having large chute widths.

As an essential feature of the invention, the structure should be substantially rigid and this is due to the use of a concave and convex surface form on the bottom of the transport chute.

The aforementioned involves certain reductions in plate thickness, from which the bottom is made, as well as, the reduction in the number of transverse stiffening elements on the chute area. The free vibration frequency of the bottom of the chute was also intensified, so in turn the dynamic load of the elements thereof, are decreased and the durability increased. Further operational advantages are also present. For example, the use of a concave surface near the feed end of the chute, for instance, raises the transport speed of material, which is profitable either when feeding material from a bunker with a small outlet area or in case of a not too large distance between the outlet and bottom of the chute.

The concave surface of the chute is also adapted to smoothly receive large grains of material, thanks to the braking action directed against the falling grains on a long path; this is essential for brittle and large mass materials, e.g. lumps of coal and metal ores.

The application of a surface fragment of the bottom of the chute with a small degree of inclination between the concave and convex part reduces the transport speed of material. This favors a uniform distribution of the transported material along the entire width of the trapezoidal chute, even in the absence of a profile lining.

Furthermore, technological advantages are also achieved due to the use of a convex surface directed downward at the discharge end. The inclination of the convex portion of the chute increases the speed motion of the transported material, thus reducing the weight of material on this part of the chute. This is advantageous either with tapering trapezoidal feeders or with widening ones, and particularly with feeders provided with a grate element at their terminal portion.

The application of a rigidly bracked frame with properly spaced longitudinal and transverse roof-beams, ensures regular transfer of forces from the drive to the chute. Despite a substantial increase in width of the chute, it is still possible to maintain loads on roof-beams as is the case with known feeder equipment. The fastening of elastic element holders at points of connection between the longitudinal and transverse roof-beams, reduces the magnitude of additional bending moments resulting from the reaction of static and dynamic forces of the supporting structure.

SUMMARY OF THE INVENTION

The main object is to overcome the defects of the prior art.

Another object of the present invention is to provide a transport chute capable of providing a uniform raw material supply for very large width installations.

Still another object of the invention is to provide an apparatus exhibiting the reduction of raw material crushing during transport, while reducing wear and weight reduction of constructional materials, as well as noise during work.

The principal features according to this invention employs a rectangular or trapezoidal transport chute tapering or widening in the direction of transport of loose material. A longitudinal section of the bottom of the transport chute to the vertical direction is concave at said inlet means, and convex at said outlet means in the horizontal position, and concave surface of the chute is placed near the supply end of material on to the feeder, whereas the convex surface is near the discharge end of material from the feeder. The side walls are fixed to the lateral edges of the bottom of the chute.

A further feature of the invention is directed to convex and concave portions of the transport chute made in the form segments of a cylindrical surface. The transition surface between the concave and convex part is continuous.

Other objects and advantages of the invention will be better understood with respect to the accompanying specification, claims and drawings.

IN THE DRAWINGS

DESCRIPTION OF INVENTION

Figure 1:
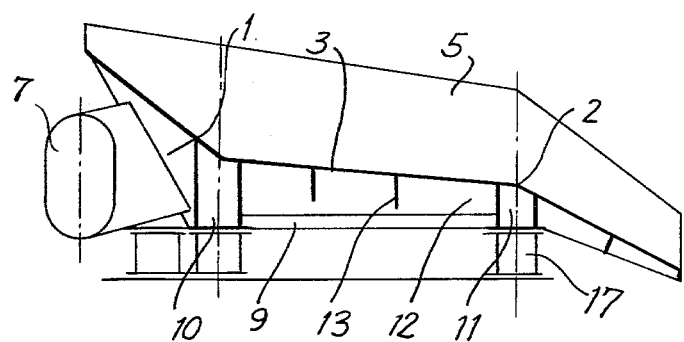
FIG. 1 illustrates a vertical section through the feeder in which plane B—B passes through the longitudinal axis.

Referring now to FIG. 1, the feeder installation comprises a transport chute fixed to a supporting frame. The feeder is set into vibratory motion by a drive connected with the supporting frame. The bottom of the transport frame is formed of three plates connected together in such a way that in the vertical section it is concave at the inlet and convex at the outlet. Material from a tank or other installation is fed on to a concave part 1 of the bottom of the chute. The convex part 2 of the bottom of the chute constitutes the discharge end with an experimentally established angle of inclination. The concave part 1 and convex part 2 are connected together by a flat part 3. Side walls 5 are fixed to the side edges 1, 2, 3 of the bottom of the chute.

Figure 2:
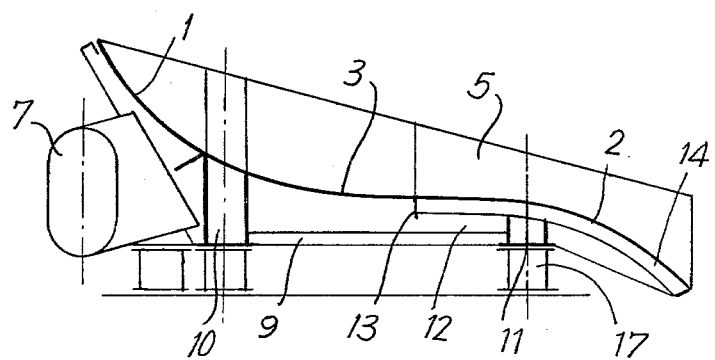
FIG. 2 illustrates the same section through the feeder with the bottom of the transport chute in the form of two cylindrical sectors put together by a flat portion.
Figure 3:
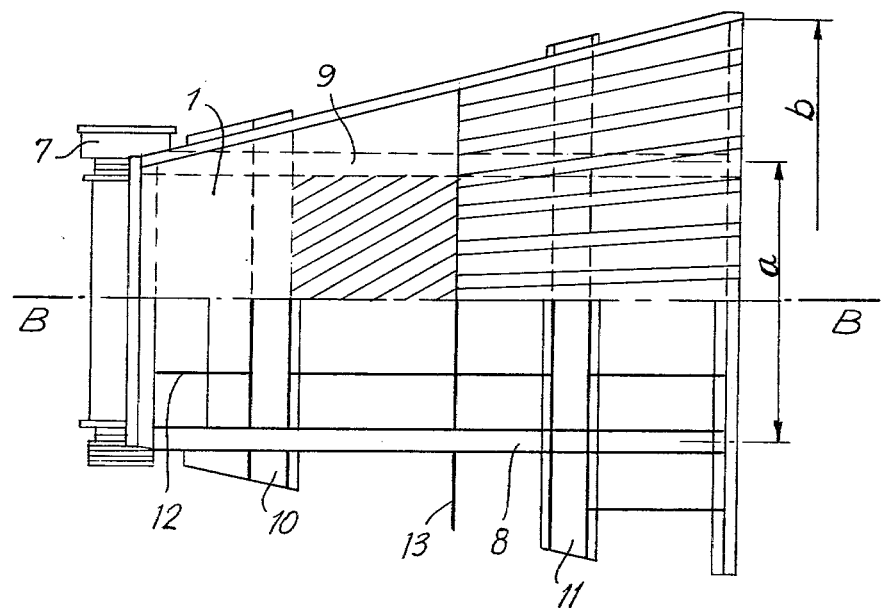
FIG. 3 illustrates a plan view of the feeder with a trapezoidal chute and the bottom and side wall removed from the right half of the feeder.

The transport chute is fastened to a rectangular eight-bracket frame, obtained through rigid connection of longitudinal roof-beams 8, 9 with the transverse roof-beams 10, 11. Distance a between the axis of longitudinal roof-beams 8, 9 is at least equal to half the width b of the wider end of the transport chute. Frame 8, 9 and 10, 11 constitutes the supporting structure of the feeding installation, to which aside the bottom 1, 2 of the chute, drive 7 and the elastic elements 17 are fastened. The bottom of the transport chute is stiffened by longitudinal plates 12 and transverse plates 13, mainly to reduce noise and prevent deformation resulting from impact of grains with a large unit mass. The feeder in the embodiment shown on FIG. 2 is provided with a transport chute, the concave portion 1 and convex portion 2 of which are made of sectors formed of a cylindrical surface. The convex portion 2 and flat portion 3 of the bottom of the widening transport chute are made in the form of a slotted grate. The grate bars 14 form slots with one another widening in the direction of material flow, and are fastened through stiffeners to the longitudinal stiffening plates 12.

Figure 4:
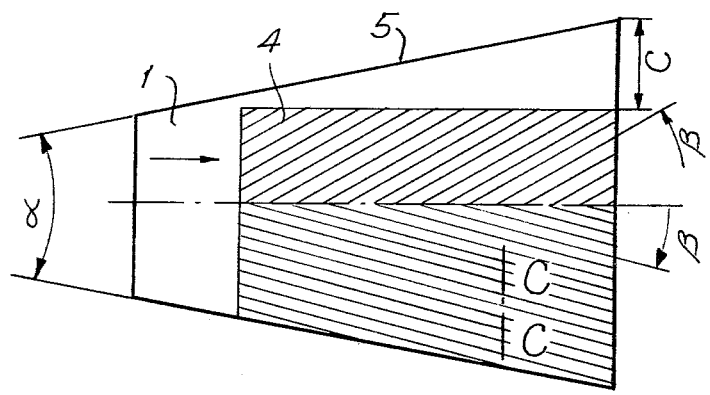
FIG. 4 is a plan view of the widening transport chute provided with the profile lining.
Figure 5:
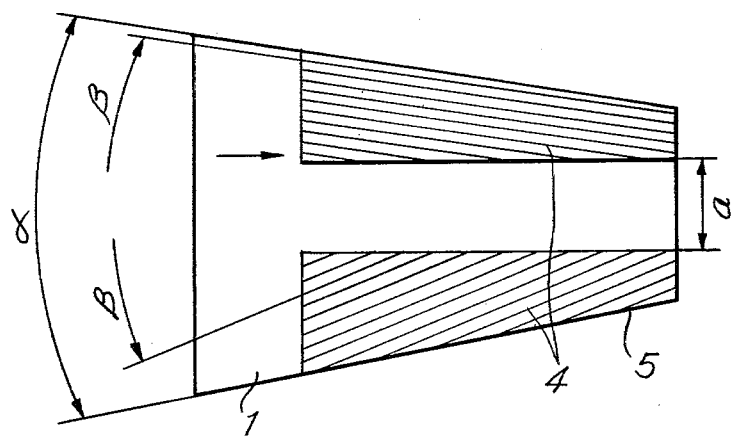
FIG. 5 is a plan view of the tapering transport chute with another lining.

FIGS. 4 and 5 show the widening and tapering trapezoidal chutes provided with the profile lining 4, and the respective halves of the chutes reveal profile linings with different angles $\beta$ formed by the crests of peats. Thus on the left half of the chute on FIG. 4 a lining for a thick material is shown, where angle $\beta$ is larger than angle $\alpha$ formed by side walls 5. This lining is placed on the widening chute at a distance c from the side wall 5. A similar situation is seen on the tapering chute shown in FIG. 5. A free strip without the profile lining having a width of d is left along the axis of the chute.

Figure 6:
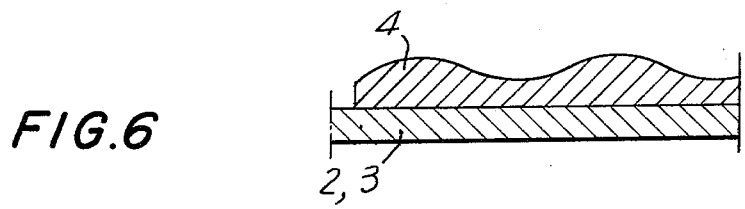
FIG. 6 is a vertical section C—C of the transport chute with the lining.
Figure 7:
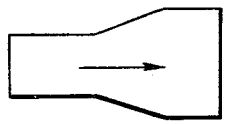
FIG. 7 is a further example of transport chutes shown in a plan view.
Figure 8:
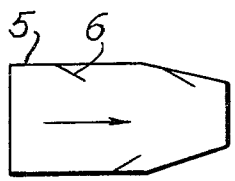
FIG. 8 is a further example of transport chutes shown in a plan view.

An example of the type of the lining 4 fixed to the bottom of the chute 2, 3 is shown in FIG. 6. FIG. 7 illustrates a vibratory feeder with a widening chute, the initial and final parts thereof are provided with side walls 5 that are parallel to the axis of the feeder FIG. 8 shows a feeder with a tapering chute, the wider portion of which has side walls 5 that are parallel to the axis of the feeder, and the deflecting plates 6 are fastened to the side walls of the chute. Plates 6 are unsymmetrically spaced, through which a free, zig-zag shaped tapering strip is placed for displacement of grains of the transported material.

Figure 9:
FIG. 9 is a further example of transport chutes shown in a plan view.

According to FIG. 9 the rectangular chute has a width, which is larger than its length. This arrangement is suitable for the transport of material from a tank with a slot-like outlet to an installation that is very large in width.

Trapezoidal chutes, as well as rectangular chutes, employed on very wide feeding installations are detachable along the axis of symmetry.

Many modifications and variations of the present invention are possible in light of the above teachings. It is, therefore, to be understood that within the scope of the appended claims, the invention may be practiced otherwise than as particularly described.

What we claim is:

1. A vibratory feeder possessing a transporting chute and a vibratory drive, connected with a supporting beam, located under a bottom of the chute and supporting elements, wherein the improvement comprises having the bottom of the transporting chute concave on the inlet side and convex on the outlet side, and that a convex and a concave part is defined as a sector of a cylindrical surface, said bottom being further defined as being fastened to a supporting, eight bracket frame comprising eight cantilever project, which frame is formed of two lengthwise beams and two crosswise beams, a distance between axes of the lengthwise beams is equal to at least a half of mean width of the chute and the transporting chute seen from top is in the shape of a rectangle.

* * * * *